US005236757A

United States Patent [19]

Probst et al.

[11] Patent Number: 5,236,757

[45] Date of Patent: Aug. 17, 1993

[54] GLASS COMPOSITE SHEATHING BOARD HAVING AN AIR RETARDER AND WATER BARRIER SHEET LAMINATED THERETO

[75] Inventors: James M. Probst; Jeffrey T. Kates, both of Littleton, Colo.; Steven C. Easley, San Rafael, Calif.

[73] Assignees: E. I. Du Pont de Nemours and Company; Manville Corporation, both of Denver, Colo.

[21] Appl. No.: 694,261

[22] Filed: May 20, 1991

[51] Int. Cl.[5] .......... B32B 3/16; B27N 9/00; C08K 3/34

[52] U.S. Cl. .......... 428/70; 428/70; 428/74; 428/77; 428/78; 428/81; 428/189; 428/190; 428/920; 156/62.2; 524/13; 524/35; 524/62; 524/493; 524/494

[58] Field of Search .......... 428/70, 74, 81, 77, 428/78, 189, 190, 291, 343, 237, 239, 296, 920; 162/156, 157.6, 158, 171; 156/62.2, 167; 524/13, 35, 62, 493, 494

[56] References Cited

U.S. PATENT DOCUMENTS

| | | | |
|---|---|---|---|
| 3,979,537 | 9/1976 | Troyer | 428/189 |
| 4,472,243 | 9/1984 | Bondoc et al. | 428/291 |
| 4,513,045 | 4/1985 | Bondoc et al. | 428/920 |
| 4,634,622 | 1/1987 | Jenkins et al. | 428/291 |

*Primary Examiner*—George F. Lesmes
*Assistant Examiner*—Kathryne E. Shelborne
*Attorney, Agent, or Firm*—Cornelius P. Quinn

[57] ABSTRACT

An insulating board in which the capacity to absorb the moisture exemplified by wood fiber based board, cellulose fiber based board and perlite based board is coupled with the high permeability of fiber glass insulation to provide a board having a balance between the capacity to hold moisture and sufficient permeance to allow the board to give up the moisture as the board is passed through a cycle of absorption and desorption, whether it be on a daily or seasonable cycle is provided with an air retarder sheet laminated thereto, which while it provides an air retarder and a water shield has a high permeance so as to allow water vapor to pass through.

6 Claims, 1 Drawing Sheet

GLASS COMPOSITE SHEATHING BOARD HAVING AN AIR RETARDER AND WATER BARRIER SHEET LAMINATED THERETO

FIELD OF THE INVENTION

This invention relates to an improved insulating sheathing board primarily directed to residential home construction and more particularly to a sheathing board having improved insulating and breathability properties with an air infiltration retarder laminated thereto.

BACKGROUND OF THE INVENTION

As a result of steadily rising energy costs, construction practices in residential housing have changed considerably. Residential dwellings are now heavily insulated and as illustrated in the co-pending patent application by Martinez, et al, Ser. No. 07/694,260 filed on Apr. 29, 1991, new products have been developed to satisfy the demands occasioned by the desire to make dwellings energy efficient. The Martinez, et al patent application discloses an insulating board which in addition to having sufficient capacity to accumulate moisture has sufficiently high permeance to permit moisture collected in the board to escape under proper conditions. Thus there has been provided an insulating board which may be used as sheathing which breathes without sacrificing the energy efficiency of the dwelling.

In addition to providing heavier insulation and, sheathing with higher "R" values in residential dwellings, the idea of wrapping a home with an air infiltration retarder has been introduced. One product which has been used to provide an air infiltration retarder is a product made from a 100 percent spun bonded olefin. This product is manufactured from high density polyethylene fibers which have been bonded by heat and pressure without binders or fillers into a tough, durable structure. Additives have been incorporated with the polyethylene to provide ultraviolet light resistance. This product not only provides an air retarder, but it provides a shield from water by not allowing water to pass through and yet has a high permeance so as to allow the passage of water vapor therethrough. In the past, this product has customarily been sold in rolls and was actually unrolled about the building and nailed thereto.

Naturally, wrapping the walls of a dwelling with such a good air retarder would be difficult, especially on a windy day, and it normally requires at least two people to secure the house wrap to the wall.

Thus, there has existed a definite need for an insulating board which in addition to having sufficient capacity to accumulate moisture and sufficiently high permeance to permit the moisture to escape under proper conditions also provides a complete air infiltration system which protects the effective insulation (R value) of the structure.

It is an object of this invention to provide a new and improved insulation board which not only meets these needs, capacitance and high permeance, but provides a continuous air retarder system as well.

It is another object of this invention to provide an insulating board having a sheet of spun bonded olefin laminated thereto.

Still another object of the present invention is to provide an insulating board with an air retarder laminated thereto wherein the air retarder sheet extends outwardly from the insulating board so as to overlap and seal one or more adjacent insulating boards.

Additional objects and advantages of the invention will be set forth in part in the description, or may be evident by the practice of the invention.

BRIEF SUMMARY OF THE INVENTION

The present invention is the combination of an insulating board in which the capacity to absorb the moisture exemplified by wood fiber based board, cellulose based board and perlite based board is coupled with the high permeability of fiber glass insulation to provide a board having a balance between the capacity to hold moisture and sufficient permeance to allow it to give up the moisture as the board is passed through a cycle of absorption and desorption of moisture whether it be on a daily or seasonable cycle coupled with an air retarder sheet laminated thereto, which while it provides an air retarder and a water barrier shield has a high permeance so as to allow water vapor to pass through.

DETAILED DESCRIPTION OF THE INVENTION

Figure 1:
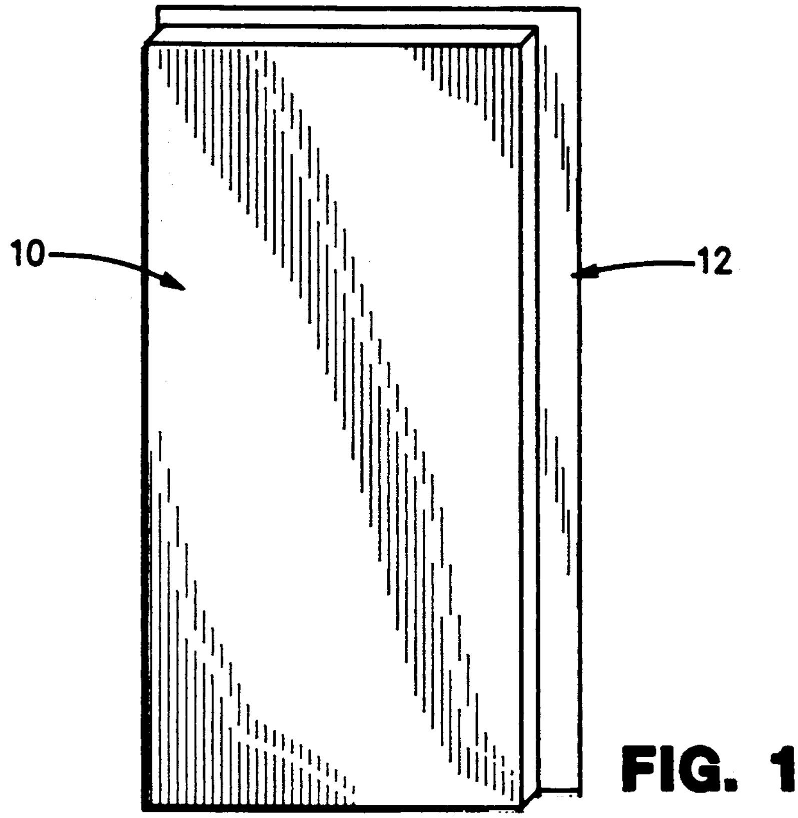
FIG. 1 is a front view of a fiber glass composite board with an air retarder sheet laminated thereto.

As illustrated in FIG. 1, a glass composite board 10 as more fully described in Martinez, et al, co-pending U.S. patent application Ser. No. 07/694,260 having a density of between 10–35 pcf, is molded from an aqueous slurry and consists essentially of 0–40% by weight perlite, 25–50% cellulose fiber, 5–60% glass fiber, 1–10% binder and 1–8% asphalt is laminated to an air retarder sheet 12 in the form of a spun bonded olefin sheet. This spun bonded olefin sheet is manufactured from high density polyethylene fibers which have been bonded by heat and pressure without binders and fillers into a tough durable sheet structure. A spun bonded olefin sheet sold under the trademark TYVEK ®, the trademark of Du pont, when tested for long term water penetration resistance was able to resist penetration of a 55 cm hydrohead for a period of five hours with no leakage observed.

The air retarder sheet 12 can be laminated to the composite glass board 10 by conventional laminating methods and adhered by the application of water based adhesives and for example be applied by bead glue applicators (not shown).

Figure 2:
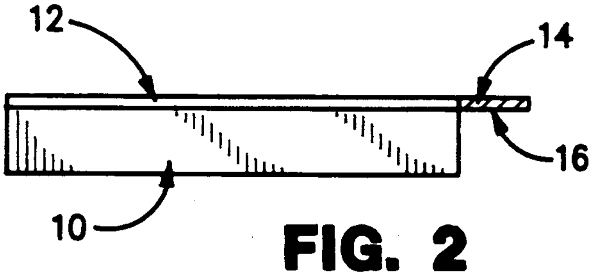
FIG. 2 is a top view of the fiber glass composite board with an air retarder laminated thereto illustrated in FIG. 1.
Figure 3:
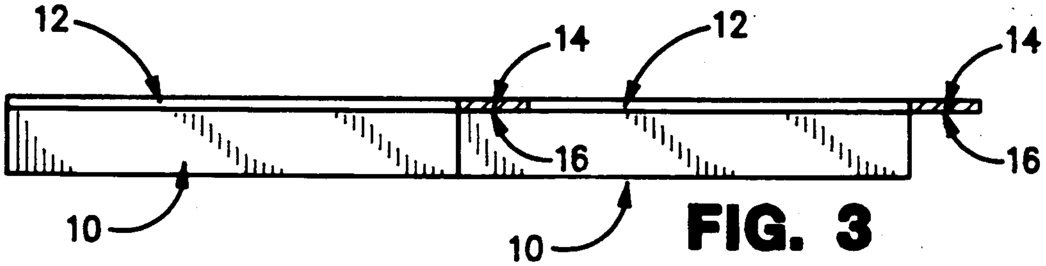
FIG. 3 is a top view of two fiber glass composite boards having air retarder sheets laminated thereto positioned adjacent to each other with a tab of the air retarder sheets overlapping the adjacent board.

The moisture vapor breathability of the spun bonded olefin air retarder sheet 12 complements the relative high permeability of the composite glass board 10. The air retarder sheet 12 which is puncture resistant also provides reinforcement to the glass composite board 10 and provides it with added strength. As illustrated in FIGS. 1 and 2, the air barrier sheet may be provided with an extension at one or more edges of the fiber glass composite board 10 forming tabs 14 to overlap adjacent laminated boards providing an air barrier system as illustrated in FIG. 3. The overlapping tabs 14 of the air retarder sheets 12 may be provided with a contact adhesive 16 to provide an effective seal with the air retarder sheets of adjacent laminated boards.

Thus it is evident that the present invention combines all the advantages of the glass composite board of Martinez, et al, with an effective air retarder and further allows the effective air retarder to be installed simultaneously with the sheathing and eliminating the necessity and difficulty of wrapping the dwelling with the air retarder sheet.

It is to be understood that the various changes to certain features which do not alter the overall function and concept of the invention may be made without departing from the spirit and scope of the invention as defined in the claims.

We claim:

1. A thermal insulation sheathing board having a density of between 10–35 pcf, molded from an aqueous slurry and consisting essentially of 0–40% by weight perlite, 25–50% cellulose fiber, 5–60% glass fiber, 1–10% binder and 1–8% asphalt having an air retarder sheet laminated to a major face thereof, the air retarder sheet being resistant to the passage of liquids, but being permeable to water vapor.

2. A thermal insulation sheathing board as defined in any of claims 1, wherein the air retarder sheet laminated thereto extends outwardly from one or more edges of the thermal insulation board forming one or more tabs to overlap adjacent laminated boards and thereby provide an air barrier system.

3. A thermal insulation sheathing board as defined in claim 2 wherein the tabs are provided with a contact adhesive to securely contact an adjacent laminated insulation board.

4. A thermal insulation sheathing board as defined in claim 1, wherein the density is approximately 13 pcf, and wherein the approximate weight percentages of the board ingredients are 15% perlite, 47% cellulose, 25% glass fiber, 8% binder, 3% asphalt added in the form of emulsion and 2% asphalt added in the form of hot melt.

5. A thermal insulation sheathing board as defined in claim 1, wherein the density is approximately 13 pcf, and wherein the approximate weight percentages of the board ingredients are 0% perlite, 47% cellulose, 42% glass fiber, 8% binder, and 3% asphalt added in the form of emulsion.

6. A thermal insulation sheathing board as defined in claim 1, wherein the air retarder sheet is a spun bonded olefin sheet.

* * * * *